March 16, 1971  M. L. REYNAUD  3,570,126

SETTING PROCESS AND DEVICE FOR DENTAL PROSTHESIS

Filed July 5, 1968

United States Patent Office 3,570,126
Patented Mar. 16, 1971

3,570,126
SETTING PROCESS AND DEVICE FOR DENTAL PROSTHESIS
Marc Louis Reynaud, 16 Bd. Gambetta,
38 Grenoble, France
Filed July 5, 1968, Ser. No. 742,927
Claims priority, application France, July 6, 1967,
5,133
Int. Cl. A61c 9/00
U.S. Cl. 32—17
8 Claims

ABSTRACT OF THE DISCLOSURE

A process and a device is disclosed for taking negative impressions of teeth which is then used to form corresponding artificial teeth. A male positioning member and a female positioning member releasably engage to establish a predefined indexing position. The male and female positioning members cooperate with a moulding ring which is configured to fit around a portion of the tooth to be artificially reproduced. Then a negative tooth impression is made of the moulded tooth and teeth adjacent thereto after which the moulded tooth and male positioning member may be separated as a unit from the tooth impression. The female positioning member is retained in the tooth impression thereby providing for subsequent alignment of the artifical tooth with the tooth impression.

---

This invention relates to the setting up of dental prosthesis, and in particular, to the formation of artificial pivoted teeth. It is more paricularly relative to the setting with respect to index markings which are indispensable when transporting molds, etc. from operations performed in the mouth of those which are to be performed in the prosthetic laboratory.

In a general manner, the passage from the dentist's office to the prosthetic lab comprises the transfer, on the one hand, of a piece constituting the counterpart of one or several drillings made on the root of the tooth, and on the other hand, of the imprint of the entire jaw.

The piece to be transferred can be the pivot itself or the pivot including the imprint of the anchoring chamber. Alternatively the pivot may be the final pivot or the temporary inlay according to the technique that the present inventor has disclosed in his French Pat. No. 1,436,854.

The index marking of positions have heretofore been made by removing with the filling the copper ring which serves for taking the imprint of the tooth and in making in its upper part a nick in the form of a V. The ring was then put back in the mouth whereupon the general imprint was formed. The paste for the imprint during the imprint of the assembly penetrating in this nick provided the counterpart thereof. Thus there was a marking which served for positioning, but this technique did not give absolute safety; additionally, the relatively new employment of silicone and other similar materials which extremely simplify the taking of imprints, prevented absolutely the withdrawal and the replacing of an imprint in the mouth.

The present invention consists in replacing the nick by two positioning members, one male, the other female, interfitting one in the other without being able to rotate, one of these parts being intended to remain in place in the general imprint after taking, the other one remaining rigid with the piece to be transferred.

Later, it will be possible in the laboratory to reconstitute the assembly of the piece transferred and the general imprint without their relative position varying.

It will be then possible to resume the other laboratory work either according to one of the classical techniques or according to the technique of the already mentioned French Pat. 1,436,854.

There will be given hereafter an example of carrying out the process of the invention along with a device for practicing the invention by way of nonlimiting example and shown in the accompaying drawings in which.

Figure 1:
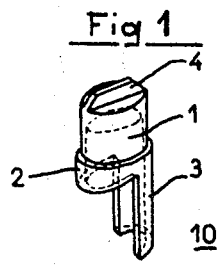
FIG. 1 shows, in perspective, the male positioning member of the assembly according to the invention.
Figure 3:
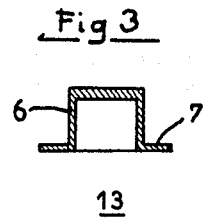
FIG. 3 shows the pusher.

As seen in FIG. 1, a male positioning member 10 has a cylindrical body 1 having at its base a small collar 2, the cross section of the cylinder being circular, elliptical or of a similar form. Opposite the cylinder 1 the small collar extends into a projecting portion or part 3 which formed as an eccentric tab intended to be blocked in the paste of the imprint. In the upper part of cylinder 1 is located an indexing indicia in the form of a rib 4 which constitutes the male part which cooperates with a corresponding indexing indicia in the form of a female slot 5 in a female positioning member 12 shown in FIG. 2. The female positioning member 12 has external truncated form and an inner form configurated to releasably fit over the exterior of the cylinder 1. When the male element is capped by the female element, the rib 4 releasably engages in slot 5 thereby defining the index positioning. In FIG. 3 there has been shown an auxiliary tool which is a pusher 13 and which has a cylindrical part 6 intended to cap cylinder 1 and a flange 7 whose edges are large enough to bear on a moulding on ring 8 which surmounts the root of the tooth to be treated.

Figure 2:
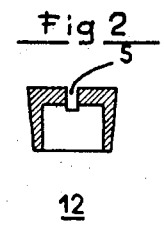
FIG. 2 shows the cross section of the female positioning member.

In FIGS. 4 to 8 are shown the different phases of use of use of the positioning device shown in the assembly of FIGS. 1 to 3. The process and operation of the positioning device will now be described.

Figure 4:
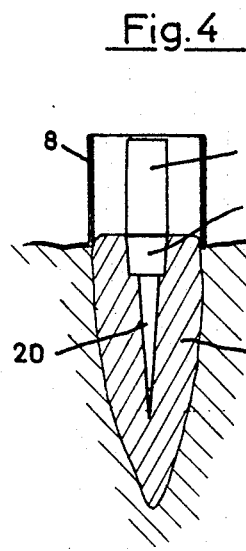
FIGS. 4 to 8 show schematically the different phases of use of the device of FIGS. 1 to 3.

At the stage to which correspond FIG. 4, the dentist has already drilled the radicular canal 20 and the anchoring chamber 21 and has already placed an inlay 22 of plstic artificial material, all this being known from the previously cited basic Pat. No. 1,436,854.

Figure 5:
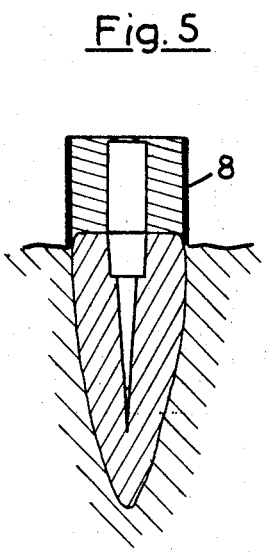
Figure 6:
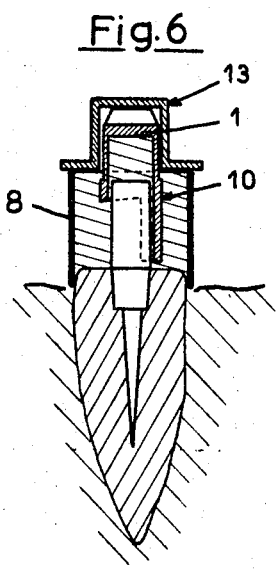

The dentist then places the molding ring 8 which he has modelled along the periphery of the tooth root 23 and which is configured to fit therearound. The height of the moulding ring has been reduced to the height of the neighboring or adjacent teeth and the head of the plastic pivot has been crushed with the blade of a hot wax knife to make it retentive. The dentist then fills the ring with a pasty moulding agent, such as silicone paste, as seen in FIG. 5. He then introduces the assembly of the positioning male member 10 in the dough, using for this introduction, the pusher 13 which surmounts cylinder 1 of the male positioning member 10 and pushes until the flange bordering pusher 13 bears against the upper section of the moulding ring 8 (FIG. 6). The male positioning member is then in place and part 3 extends into the moulding agent interiorly of the cylinder 1 such that the indexing portion 4 projects beyond the uper edge of the moulding ring 8.

Figure 7:
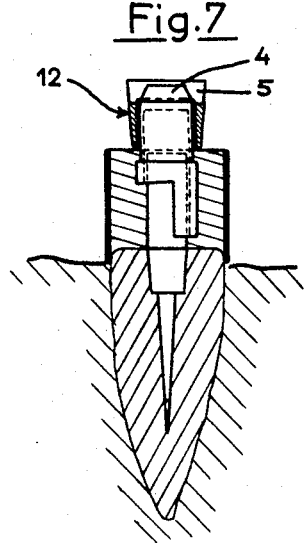
Figure 8:
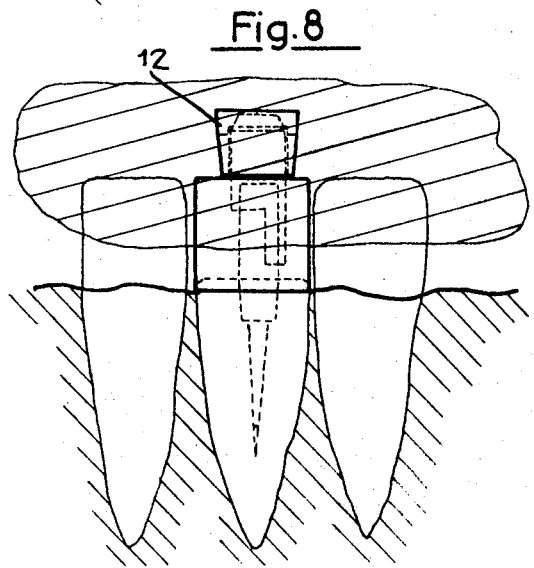

Then the dentist removes the pusher 13 and replaces it by the female positioning member 12 (FIG. 7). This operation terminated, he takes the general imprint or negative tooth impression in the usual manner (FIG. 8). Peripherally extending retention means is provided on the female positioning member 12 to effectively retain this member in the imprinting paste after same has hardened. In the embodiment shown in FIG. 3, the retention means comprises a tapered or truncated configuration. Owing to the member will remain embedded in the imprinting paste when the same has set, while it will be possible to easily withdraw the moulding ring 8 carrying with it the male positioning member 10 and the inlay 22.

Thus it will be safe to separately transfer to the prosthetic laboratory the general imprint and the moulding ring 8 and its accessories while at all times being able to reestablish the exact relative angular and longitudinal position of these elements due to the indexing indicia comprising the slot 5 and rib 4.

It will then be possible for the prosthetist to continue with the usual work: forming of a temporary root, forming of the usual cap, obtaining of the metallic inlay, and all the operations that are described in the French Pat. No. 1,436,854.

What is claimed is:

1. A process for taking negative impressions of teeth comprising: placing a ring over a tooth whose impression is to be taken; filling the ring with a pasty moulding agent; inserting a first positioning member having a pair of opposed end portions in said ring so that one of said end portions penetrates into said moulding agent and the other end portion projects from said ring; placing a second positioning member having a portion releasably engageable with said other end portion in releasable engagement with said first positioning member; applying a pasty moulding agent covering at least said second positioning member and surrounding part of said tooth to take a general negative impression; withdrawing said general impression including said second positioning member; and withdrawing said ring including said impression of said tooth and said first positioning member.

2. A process for taking negative impressions of teeth comprising: forming a mold having an indexing indicia thereon of a tooth whose impression is to be taken; taking a negative impression of said mold and teeth adjacent thereto having a mating indexing indicia aligned with said first-mentioned indexing indicia; removing said negative impression while retaining therein said mating indexing indicia; and then withdrawing said mold from said tooth; whereby said mold can subsequently be correctly orientated within said negative impression by aligning said indexing indicia.

3. A positioning device to be used in taking negative impressions of teeth by means of a moulding ring, comprising: a pair of positioning members defining a longitudinal axis and having mating end portions capable of longitudinally fitting together, one of said positioning members having another end portion insertable in said moulding ring while its mating end portion projects from said ring, the other said positioning member having peripherally extending retention means for retaining said second member embedded in a moulding agent against longitudinal displacement.

4. A device as claimed in claim 3; wherein said mating end portions include means for retaining said positioning members against relative rotary movement.

5. A device as claimed in claim 3; wherein said another end portion of said first positioning member comprises a longitudinally extending eccentric tab.

6. A device as claimed in claim 3; wherein said mating end portion of said first positioning member comprises a male portion and said mating end portion of said second positioning member comprises a female portion.

7. A device as claimed in claim 6; further comprising a cap member dimensioned to cover said male portion to push said first positioning member in said moulding ring.

8. A positioning device cooperative with a molding ring for taking negative impressions of teeth comprising: a molding ring configured to fit around a tooth; a pair of releasably engageable positioning members; one of said positioning members having a projecting portion insertable interiorly of said molding ring and an indexing portion dimensioned to extend exteriorly of said molding ring when said projecting portion is inserted therein; the other of said positioning members having a mating indexing portion releasably engageable with said first-mentioned indexing portion and defining when in engagement therewith a correct alignment of said pair of positioning members, and means on said other positioning member for retaining same within a molding compound.

References Cited

UNITED STATES PATENTS

| 2,237,350 | 4/1941 | Hollmann | 32—13 |
|---|---|---|---|
| 3,304,608 | 2/1967 | Frohnecke | 32—117 |

FOREIGN PATENTS

| 1,004,861 | 12/1951 | France | 32—13 |

ROBERT PESHOCK, Primary Examiner